United States Patent

[11] 3,562,435

[72] Inventor Amos E. Joel, Jr.
South Orange, N.J.

[21] Appl. No. 787,378
[22] Filed Dec. 27, 1968
[45] Patented Feb. 9, 1971
[73] Assignee Bell Telephone Laboratories, Incorporated
Murray Hill, N.J.
a corporation of New York

[54] SWITCHING SYSTEM WITH AUTOMATED MAIN DISTRIBUTING FRAME
15 Claims, 15 Drawing Figs.

[52] U.S. Cl. .......... 179/16, 179/98
[51] Int. Cl. .......... H04q 1/18, H04m 3/00
[50] Field of Search .......... 179/16, 98

[56] References Cited

Applicant' s citation: The Bell System Technical Journal, Vol XLIII Number 5, September 1964 pp 2431-4

*Primary Examiner*—William C. Cooper
*Attorneys*—R. J. Guenther and James Warren Falk

ABSTRACT: A telephone system comprising conventional station apparatus (outside plant) and associated conductors and conventional central office equipment (inside plant) and associated conductors is provided with a main distributing frame switching network upon which the outside plant conductors and inside plant conductors are terminated. Control circuitry is provided including a memory which is responsive to signals from a teletypewriter for selectively interconnecting the outside plant conductors with the inside plant conductors by exclusive linkage paths. The switching network is rearrangeable, and circuitry is provided to detect the idle or active state of all conductors and to inhibit the execution of network interconnection commands during the active state of any affected conductor.

In another aspect of the disclosure, a junctor circuit is associated with the inside plant and outside plant side of the main distributing frame switching network and is controllable from a test desk so as to provide access selectively to a station circuit or to a central office circuit, or in the alternative, to provide simultaneous access to both circuits via serial insertion of the junctor circuit therebetween.

INVENTOR
A. E. JOEL, JR.
BY
ATTORNEY

PATENTED FEB 9 1971

3,562,435

SHEET 10 OF 12

FIG. 10
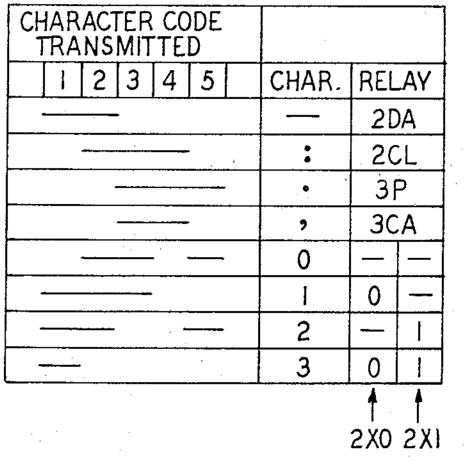
FIG. 11
| PERMUTATION INPUT 0123 | OPERATED ELEMENTS– | SWITCHING NETWORK 104 |
|---|---|---|
| OUTPUTS 0123 | | |
| 0132 | 8C | 8A, 8C, 9E |
| 0213 | 8A | |
| 0231 | 8A, 9E | |
| 0312 | 8A, 8C | 8C, 9E |
| 0321 | 9E | |
| 1230 | 8B, 8C, 9D | |
| 1203 | 8A, 8B | 8B, 9D |
| 1302 | 8A, 8B, 8C | |
| 1320 | 8A, 8B, 8C, 9D | |
| 1023 | 8B | 8A, 8B, 9D |
| 1032 | 8B, 8C | |
| 2013 | 8A, 9D | |
| 2031 | 8A, 9D, 9E | |
| 2103 | 9D | |
| 2130 | 8C, 9D | 8A, 8C, 9D, 9E |
| 2301 | 9D, 9E | |
| 2310 | 8A, 8C, 9D | 8C, 9D, 9E |
| 3012 | 8B, 8C, 9E | |
| 3021 | 8B, 9E | 8A, 8B, 9D, 9E |
| 3102 | 8A, 8B, 8C, 9E | |
| 3120 | 8A, 8B, 8C, 9D, 9E | |
| 3201 | 8A, 8B, 9E | 8B, 9D, 9E |
| 3210 | 8B, 8C, 9D, 9E | |
FIG. 12
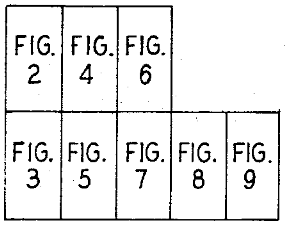
FIG. 13
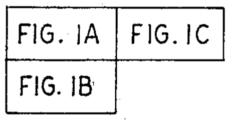

SWITCHING SYSTEM WITH AUTOMATED MAIN DISTRIBUTING FRAME

BACKGROUND OF THE INVENTION

1. Field of the Invention

This invention relates to main distributing frame networks in switching systems.

2. Description of the Prior Art

The need to provide a a point of complete flexibility between outside cable plant and wire center equipment was recognized with the advent of the central office Thus, a main distributing frame evolved which provided terminations for outside plant cable pairs on a fixed basis on one side of the frame with similar terminations for inside plant conductors on the other side of the frame. Wire cross-connections, manually placed, then connected the desired central office circuit to the proper outside plant cable pair. Although substantial improvements in technology have occurred in automatic switching systems in the intervening years, the basic main distributing frame design has not changed in over half a century.

The retention of the present main distributing frame is attributable, in part, to certain advantages which it presents,. For example, it is completely nonblocking in nature. Thus, any particular outside plant pair is capable of physical connection through to an appropriate central office circuit by placing an additional cross-connection pair. The physical termination of conductors also provides a convenient point for maintenance test access. In addition, the physical equipment of which the main distributing frame is constructed consists principally of iron work and terminal strips, thus constituting a relatively low plant investment. However, these factors are no longer sufficiently advantageous when it is recognized that, although the plant investment is low, the continuing need for investment in labor is extremely high. In addition, existing frames in many cases have grown far beyond their initially estimated sizes, thus forcing unreasonable measure to be taken to provide the necessary capacity. Massive reterminations, the physical requirement that portions of the distributing frame be segregated and interconnected with large cross-connection tie cables, and the phenomenal growth of individual switching system offices have contributed to maintenance problems, which in some instances have rendered many cross-connection changes impossible or at least prohibitively expensive. And, finally, the limitation of access for test purposes by manual means further compounds the disadvantages in view of the physical complexity of present day distributing frames.

Accordingly, a need exists in the art for an arrangement which will obviate the high investment in labor necessary to perform the main distributing frame function in wire centers. A need also exists for an arrangement which will permit the automatic main frame function to continue to be performed with complete flexibility, but without an increase in plant investment which is economically prohibitive. A need also exists for an arrangement which will perform the main distributing frame function in a manner which is readily adaptable to any switching system office irrespective of the type of office involved.

SUMMARY OF THE INVENTION

In the exemplary embodiment a central office is provided with a main distributing frame switching network having a plurality of input and output appearances. outside plant conductors are terminated on the input appearances while central office circuit facilities are terminated on the output appearances. The switching network is rearrangeable in that it is capable of providing a permutation of the outputs with respect to the inputs. Thus, a predetermined input appearance may be selectively connected through to a predetermined output appearance by any one of a number of network paths. Apparatus is provided for enabling the switching network and also to record the present permutation of the network. Additional apparatus is also provided to detect and register signals from an associated teletypewriter which indicates the desired connection which is to exist between the network input appearances and the network output appearances. Apparatus is also provided to delay the enabling of the switching network when a proposed permutation change involves appearances which are presently engaged in a telephone communication path.

In accordance with one feature of my invention, a switching network is provided which is rearrangeable in design and is operable to interconnect outside plant cable conductors and central office circuits.

Another feature of my invention is the provision of means associated with a teletypewriter which is operable to register and detect signals identifying network appearances which are to be interconnected and to translate this information into further signals which are operable to cause rearrangement of the switching network crosspoints in accordance therewith.

In accordance with still another feature of my invention, the foregoing is accomplished under control of means which are operable to detect the active state of any circuit which is connected with another circuit by the switching network, and to delay the execution of a network rearrangement until the idle state of all such circuits.

BRIEF DESCRIPTION OF THE DRAWINGS

The foregoing objects, features and advantages, as well as others, of the invention will be more apparent from a description of the drawing, in which:

FIGS. 10 and 11 provide tabular information associated with FIGS. 2 through 9; and FIG. 12 shows the manner in which FIGS. 2 through 9 should be arranged.

FIG. 13 shows the manner in which FIGS. 1A, 1B and 1C should be arranged.

It will be noted that FIGS. 2 through 9 employ a type of notation referred to as "Detached Contact" in which an "X," shown intersecting a conductor, represents a normally open "-make" contact of a relay, and a "bar," shown intersecting a conductor at right angles, represents a normally closed "-break" contact of a relay; "normally" referring to the unoperated condition of the relay. The principles of this type of notation are described in an article entitled "An Improved Detached-contact-type of Schematic Circuit Drawing" by F. T. Meyer, in the Sept. 1955, publication of American Institute of Electrical Engineers Transactions, Communications and Electronics, Volume 74, pages 505—513.

1. General Description

Figure 1A:
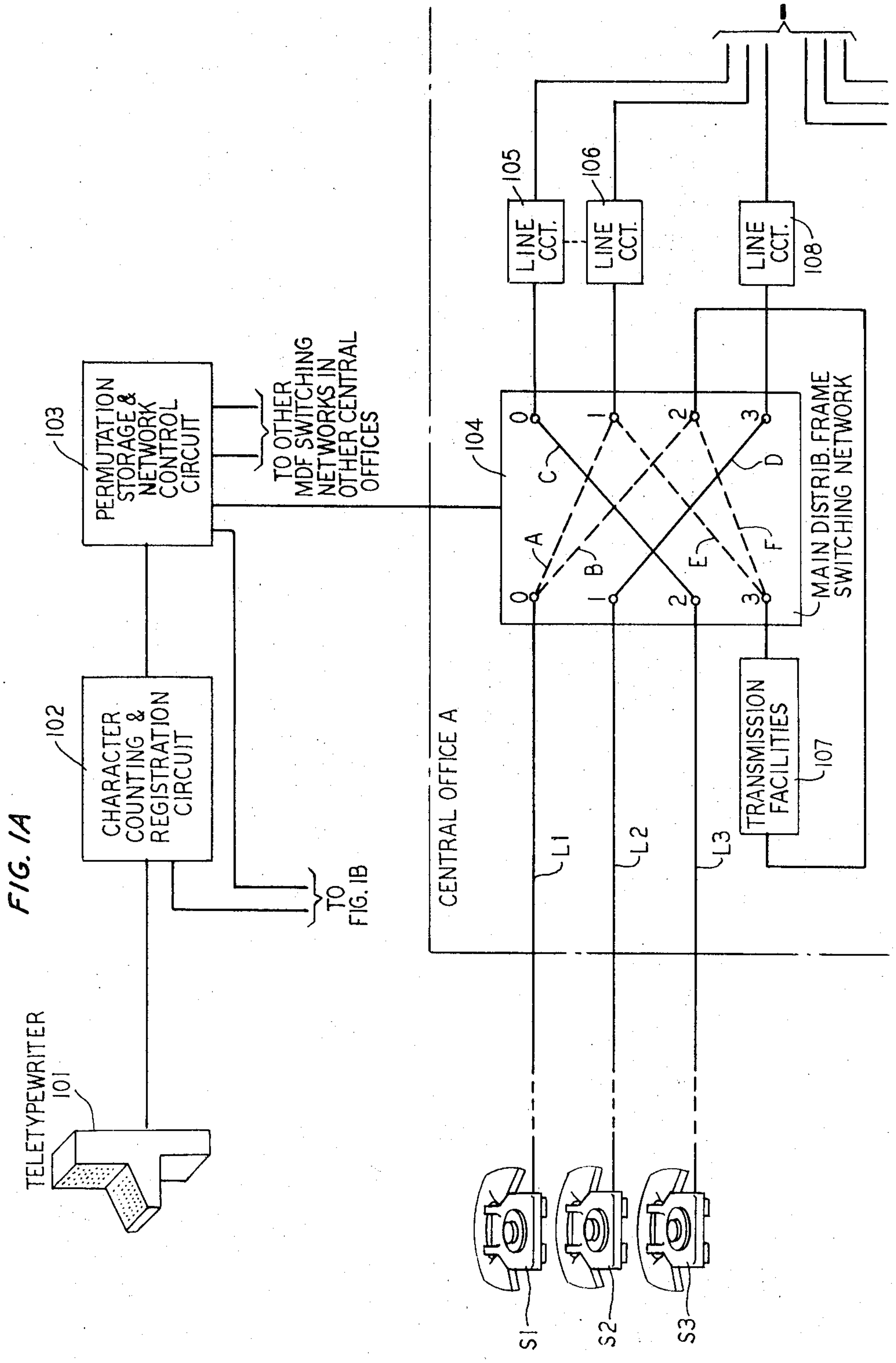
FIGS. 1A, 1B, and 1C, when arranged as shown in FIG. 13, are a block diagram showing the interrelationship of various components of an illustrative embodiment of my invention.
Figure 1B:
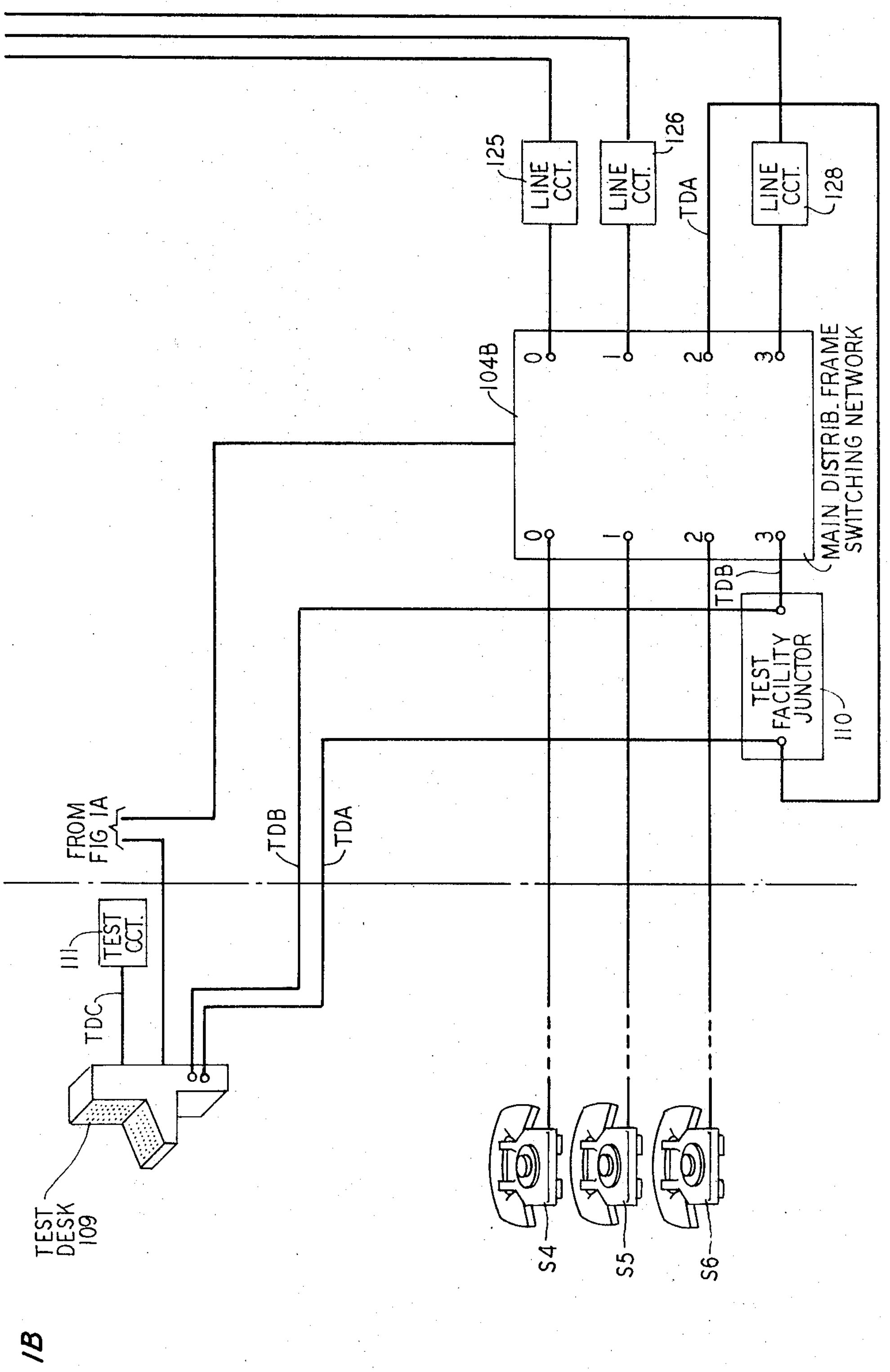
Figure 1C:
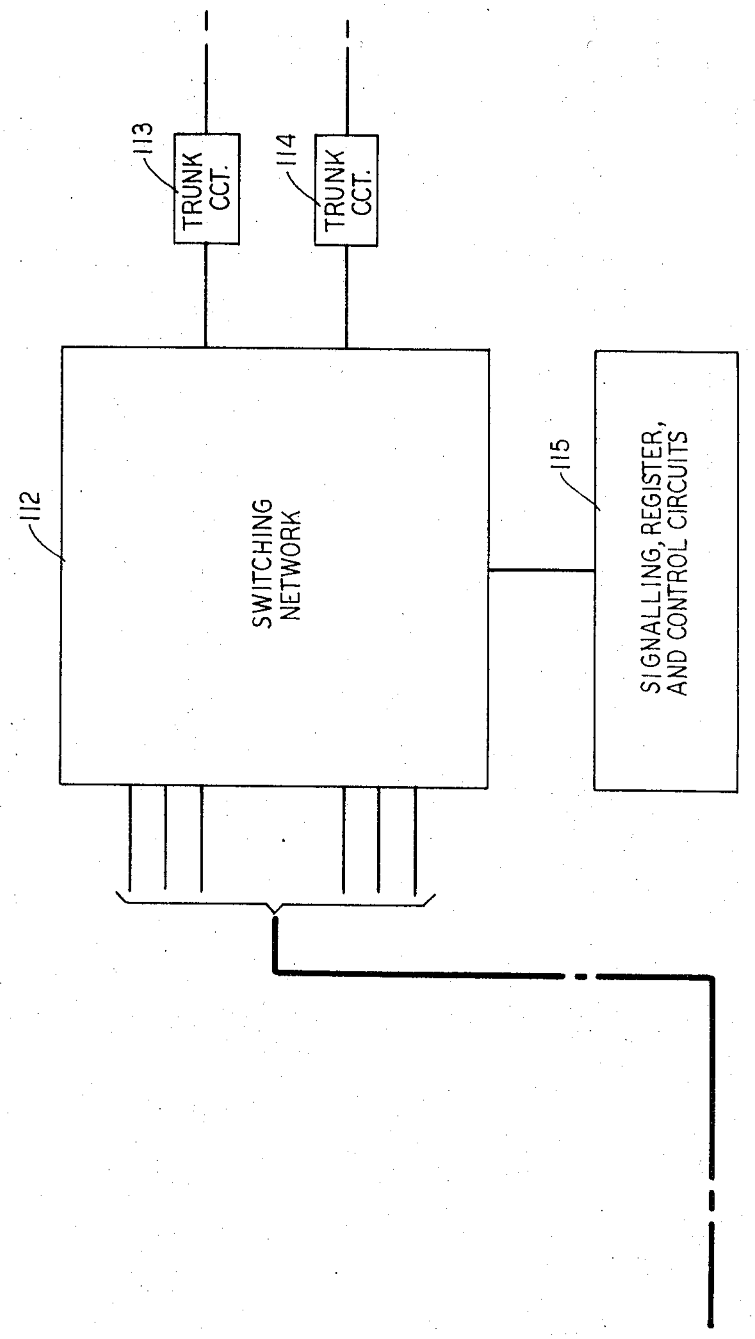

Referring now to FIGS. 1A, and 1C, it is intended that the apparatus shown thereon is associated with a conventional telephone central office (wire center). It is further intended that the central office comprises a switching network 112 for terminating trunks 113 and 114 and line circuits 105, 106, and 108, and the usual control circuitry, such as signaling, register and control circuit 115 which are necessary to establish communications paths between telephone stations. The distinction within the conventional central office is the replacement of the well-known main distributing frame with the main distributing frame switching network 104 as shown in FIG. 1A.

For purpose of the embodiment we shall assume that stations S1, S2 and S3 are conventional telephone stations whose conductors are terminated on main distributing frame switching network 104 and further that line circuits 105, 106 and 108 are also terminated on switching network 104 and comprise circuitry well known in the art operable to recognize off-hook and on-hook signals from telephone stations. We shall also assume that transmission facility 107 comprises any one of a number of auxiliary circuits which are interposed in telephone communications paths from time to time in order to provide certain features; for example, transmission facilities circuit 107 could comprise a dial long line circuit which is provided to permit detection of dial pulses transmitted from a telephone station which is located a relatively long distance from the central office.

Teletypewriter 101 may comprise any number of configurations well known in the art operable to electrically transmit information in coded form. It will be apparent from that which is contained hereinafter that, although teletypewriter 101 is utilized to transmit control information required to establish connections through switching network 104, in fact, numerous other information transmitting apparatus, automatic or manual, may be employed for this purpose. As will also be apparent from that which is contained hereinafter, character counting and registration circuit 102 accepts the coded information from teletypewriter 101 and registers this information for forwarding to permutation storage and network control circuit 103. This latter circuit provides facilities for controlling switching network 104 so as to implement the particular permutation which is required by the central office at a given time. It is further arranged to provide storage in memory of the permutation which is currently effective in network 104 so as to facilitate a change in the permutation when such change is required. It also will be obvious from that which is contained hereinafter that, although only one switching network is discussed in detail, the proposed circuit blocks 101, 102 and 103 may, in fact, be arranged to control a plurality of similar switching networks in other central offices or wire centers by application of the principles of my invention as hereinafter set forth.

Proceeding now with the description; an examination of switching network 104 as shown on FIG. 1 reveals that stations S1, S2 and S3 are connected to input terminals 0, 1 and 2, respectively. Line circuits 105, 106 and 108 are respectively associated with output terminals 0, 1 and 3 of switching network 104. Transmission facilities circuit 107 is connected to output terminal 2 of switching network 104 and also connected through to input terminal 3 of the same network.

We shall assume that the traffic and circuit considerations require the association of input terminals 0, 1, 2 and 3 with output terminals 2, 3, 0 and 1, respectively. When this permutation is effected, station S1 will be connected via a connection extending through network 104 which is symbolically represented by the dashed conductor B to output terminal 2, which connection thereupon extends through transmission facilities circuit 107 to input terminal 3 of switching network 104 and then via dashed conductor E to line circuit 106. In similar fashion station S2 will be associated via a connection through network 104, which is represented symbolically by conductor D, to line circuit 108. And in similar fashion station S3 is connected through to line circuit 105 via conductor C. The connecting paths symbolically represented by the dashed conductors designated A and F are not effective at this time.

To effect the foregoing permutation, the attendant at teletypewriter 101 keys a coded pattern of control signals comprising a series of characters as follows:

:2301.

These characters are thereupon recognized in sequence in character counting and registration circuit 102 for forwarding to permutation storage and network control circuit 103. As will be apparent from that which is contained hereinafter this latter circuit controls the crosspoints in switching network 104 by which a desired permutation is effected. Upon registration in this circuit of the desired permutation, it is executed upon ascertaining that all involved circuit paths are in an idle state. Thus, upon execution, the circuit paths, symbolically designated in circuit 104 by conductors B, D, C and E, are established. The teletypewriter 101 is advised of this fact by a lighted lamp, the control circuitry returns to normal and permutation storage circuit 103 retains in storage the permutation which is presently in effect in network 104.

We shall now assume for purposes of the description that line circuits 105, 106 and 108 are substantially identical to each other and that it is now no longer necessary to interpose transmission facilities circuit 107 in series with the loop which extends from station S1 through to line circuit 106. We shall further assume that it is not desirable to do so at this time because of reassociation of the outside cable plant conductors which bring station S1 electrically closer to the central office. The attendant at the teletypewriter thus desires to change the connection which presently extends from input terminal 0 to output terminal 2, so that it will extend from input terminal 0 directly to output terminal 1. As will be apparent from that which is contained hereinafter, this change in permutation is effected by transmission of a coded pattern of control signals constituting the following command:

—01, which, in effect, means change the connection from input terminal 0 to output terminal 1. And, as a corollary of this also means to change input terminal 3 to output terminal 2.

In a manner similar to that above described this information is recorded in character counting and registration circuit 102 which recognizes it as a command to change the existing permutation. The information is forwarded to permutation storage and network control 103 which thereupon erases those characters in the previous permutation which differ from the proposed permutation. The new permutation is thereupon executed. As a result of the foregoing, the station S1 loop which extends to input 0 will now be connected via path A directly to line circuit 106 and input terminal 3 will be extended via path F to output terminal 2 thereby removing transmission facilities circuit 107 from effective operation at this time.

As will be discussed in the following, as a series of permutation changes may be accomplished by the generation of a series of commands, with a single final request for execution of as many such changes as may be necessary or are required to provide the interconnection of the inputs and outputs on main distributing switching frame 104. In each instance, however, the association and reassociation of inside plant conduction and outside plant conduction are accomplished without requiring the manual placement of cross-connections or manual activity of any nature with the exception of the illustrative enabling of the appropriate keys at a teletypewriter.

2. Detailed Description

It is believed that a clearer understanding of the detailed description of the illustrative embodiment will be facilitated by a preliminary brief discussion of the circuitry shown on FIGS. 2 through 9. An examination of these FIGS. will reveal that each apparatus designation contains a digital prefix. This digital prefix is provided to precisely locate the FIG. upon which the principal portion of the apparatus is shown. Thus, for example, relay 30N has its operating winding shown on FIG. 3. Make contact 30N-1 (shown on FIG. 7) contains a suffix digit which identifies the particular make contact numerical designation while, as earlier stated, the digital prefix 3 indicates that the operating winding for the relay which controls make contact 30N-1 is shown on FIG. 3.

Figure 2:
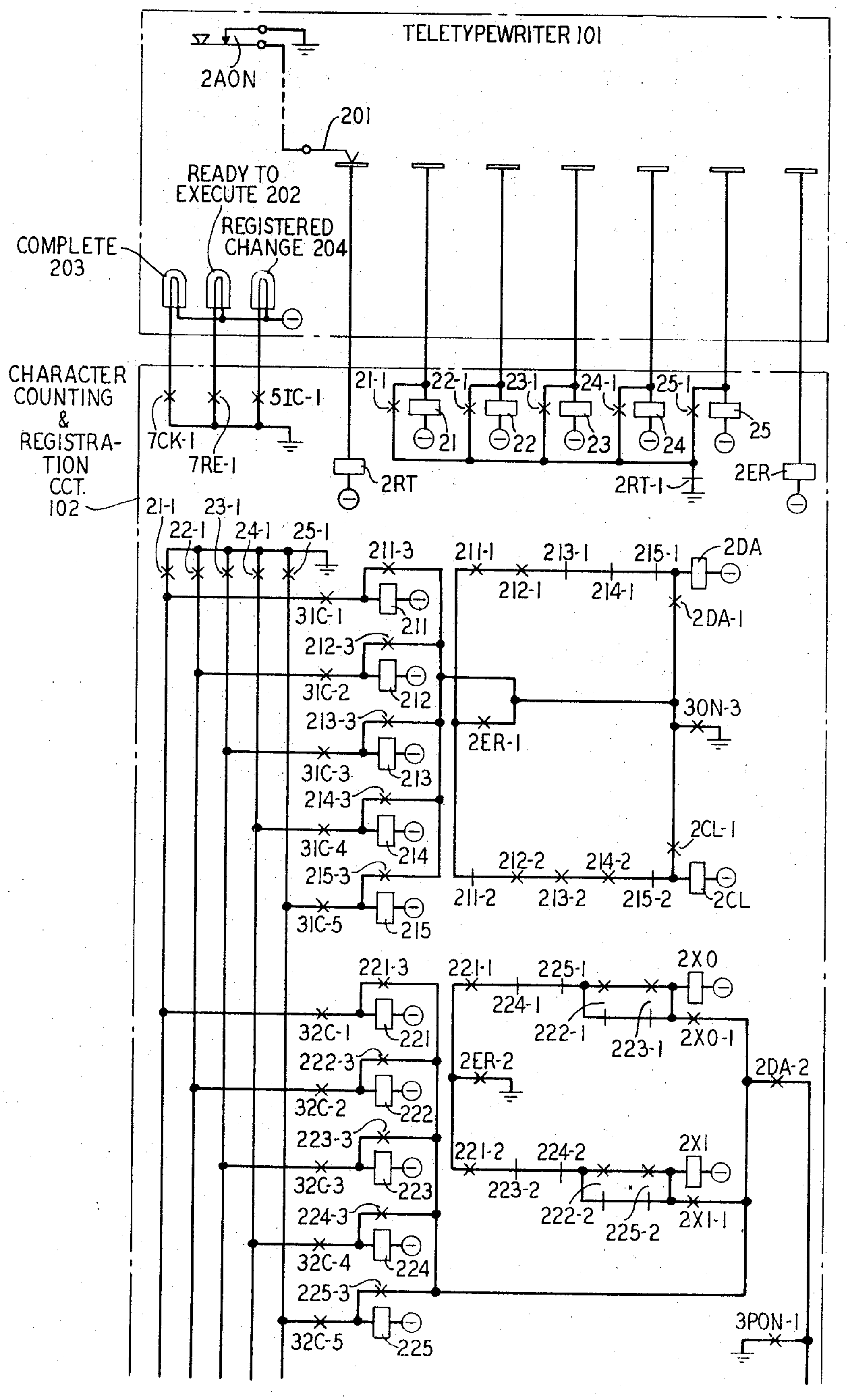
FIGS. 2 through 9 are schematic diagrams showing in more detail the functioning of the exemplary embodiment.
Figure 3:
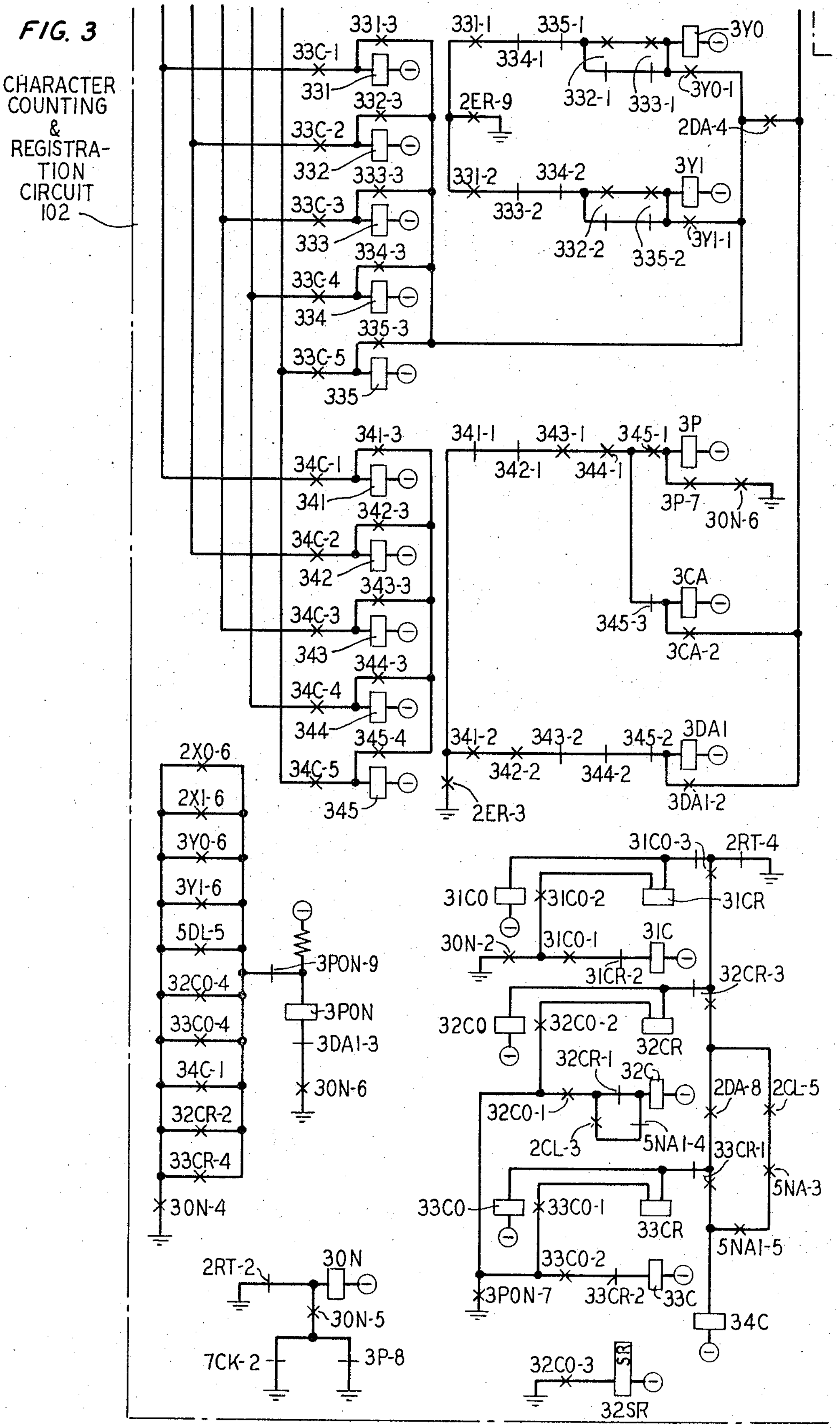

FIGS. 2 and 3 contain the apparatus which is utilized in the illustrative embodiment to detect and register the information transmitted from teletypewriter 101 and also to provide the necessary supervisory functions.

Figure 4:
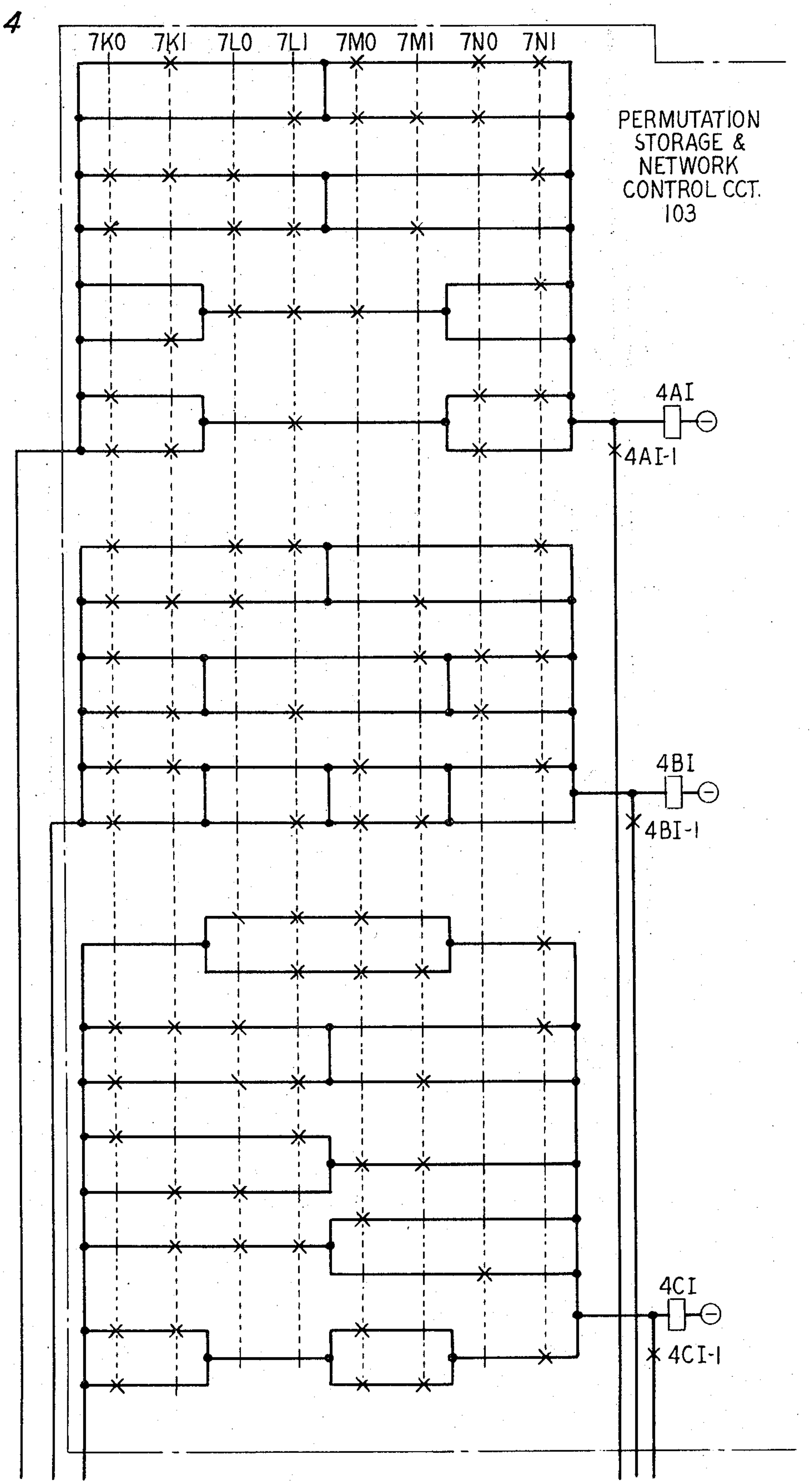
Figure 5:
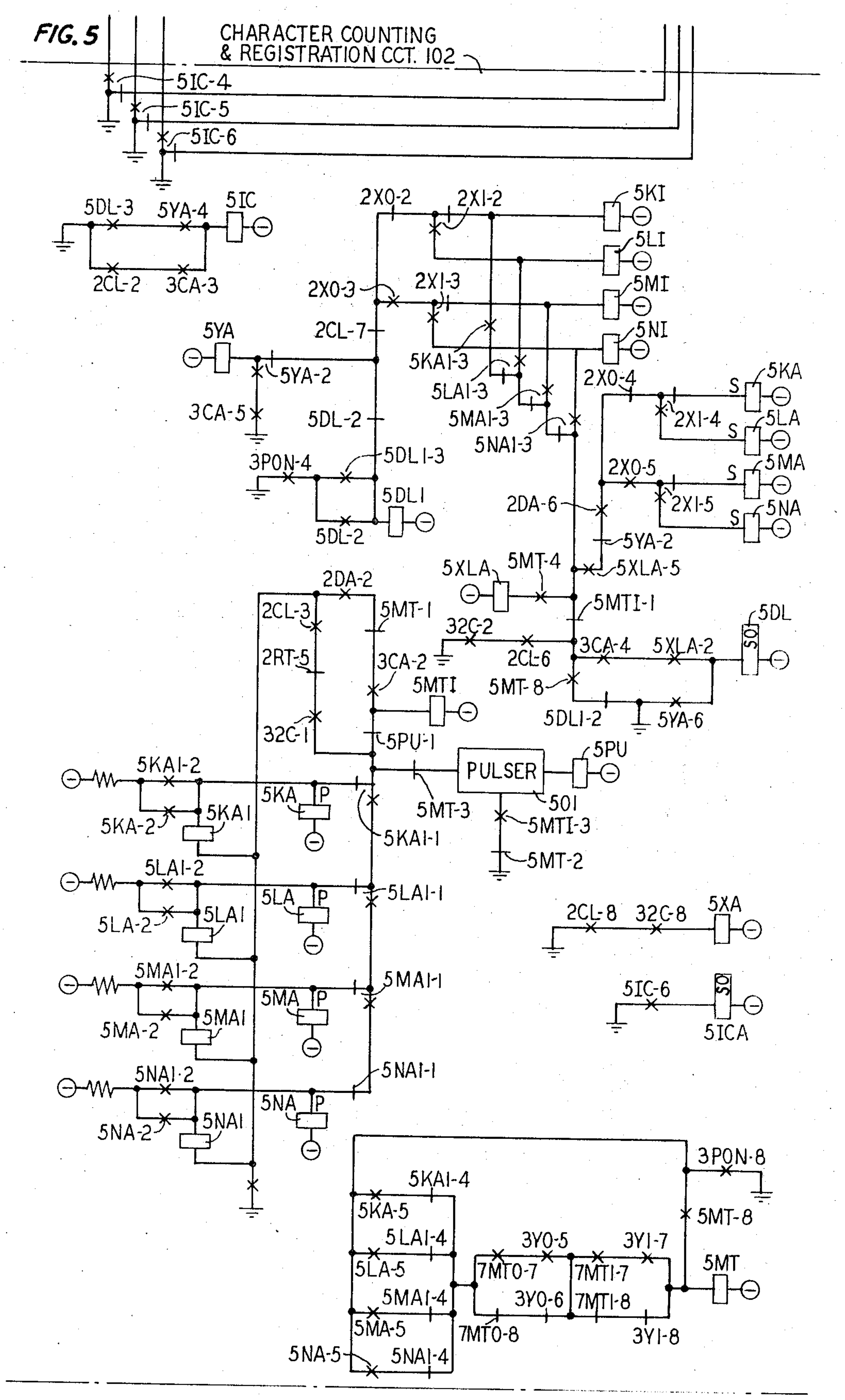
Figure 6:
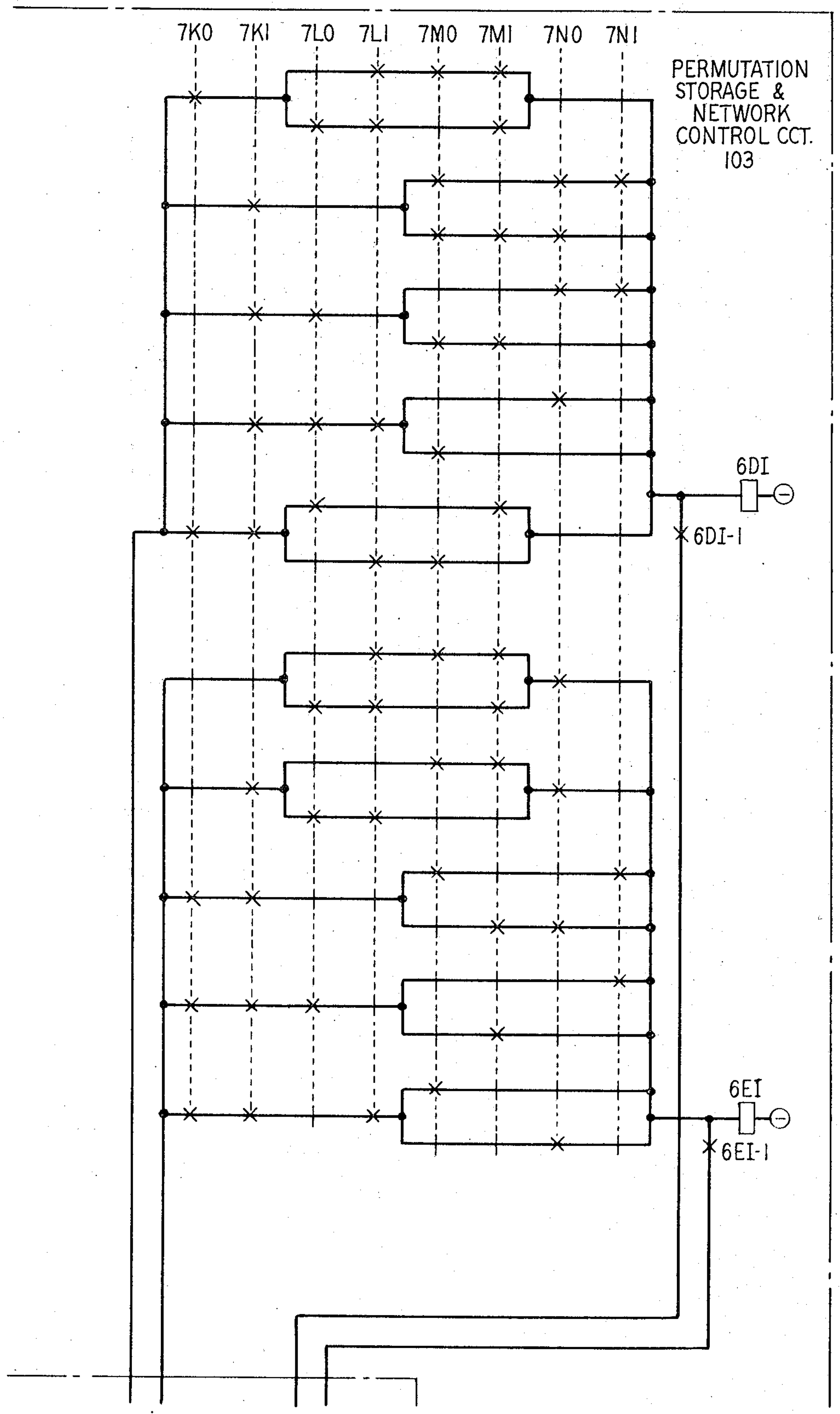
Figure 7:
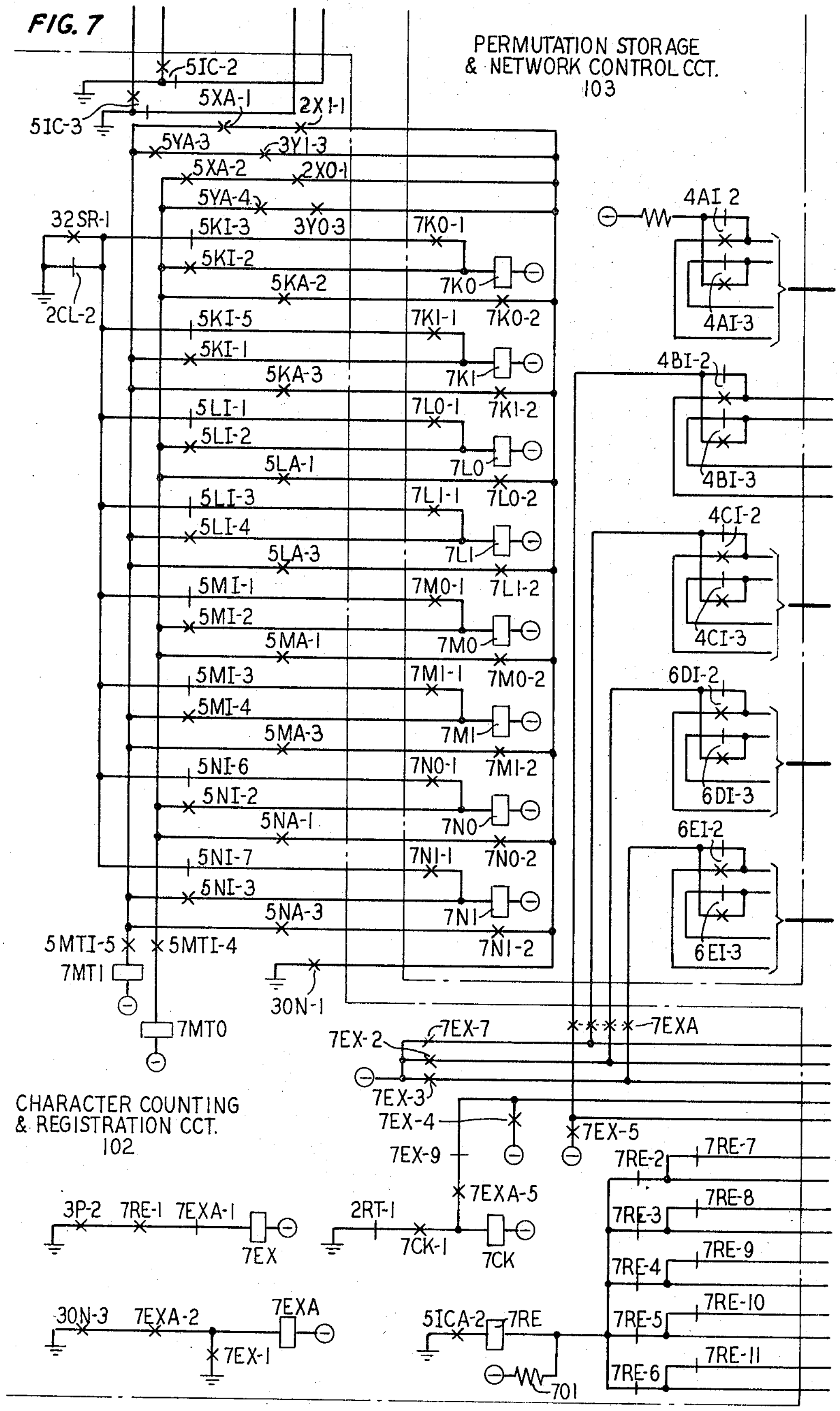
Figure 8:
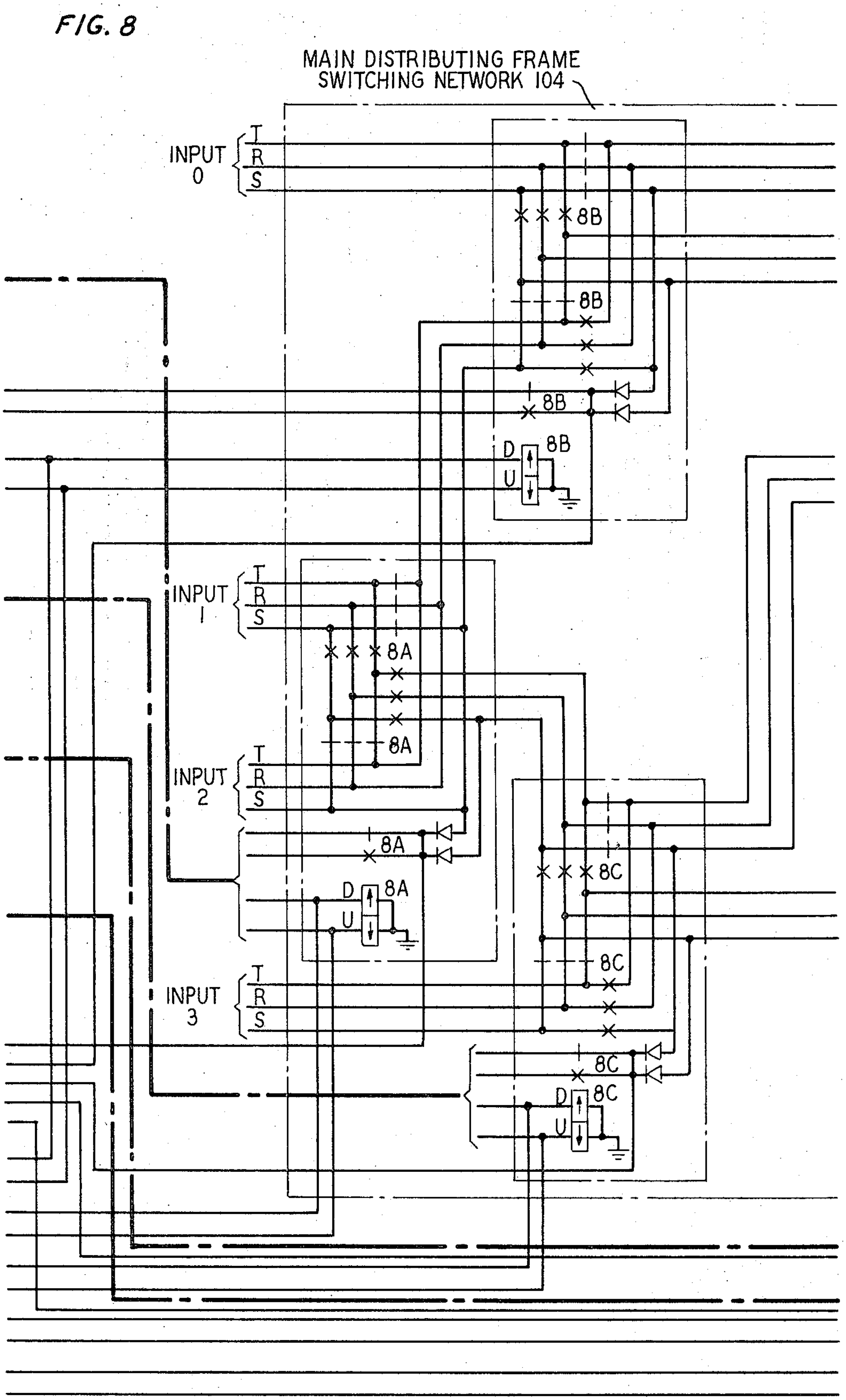
Figure 9:
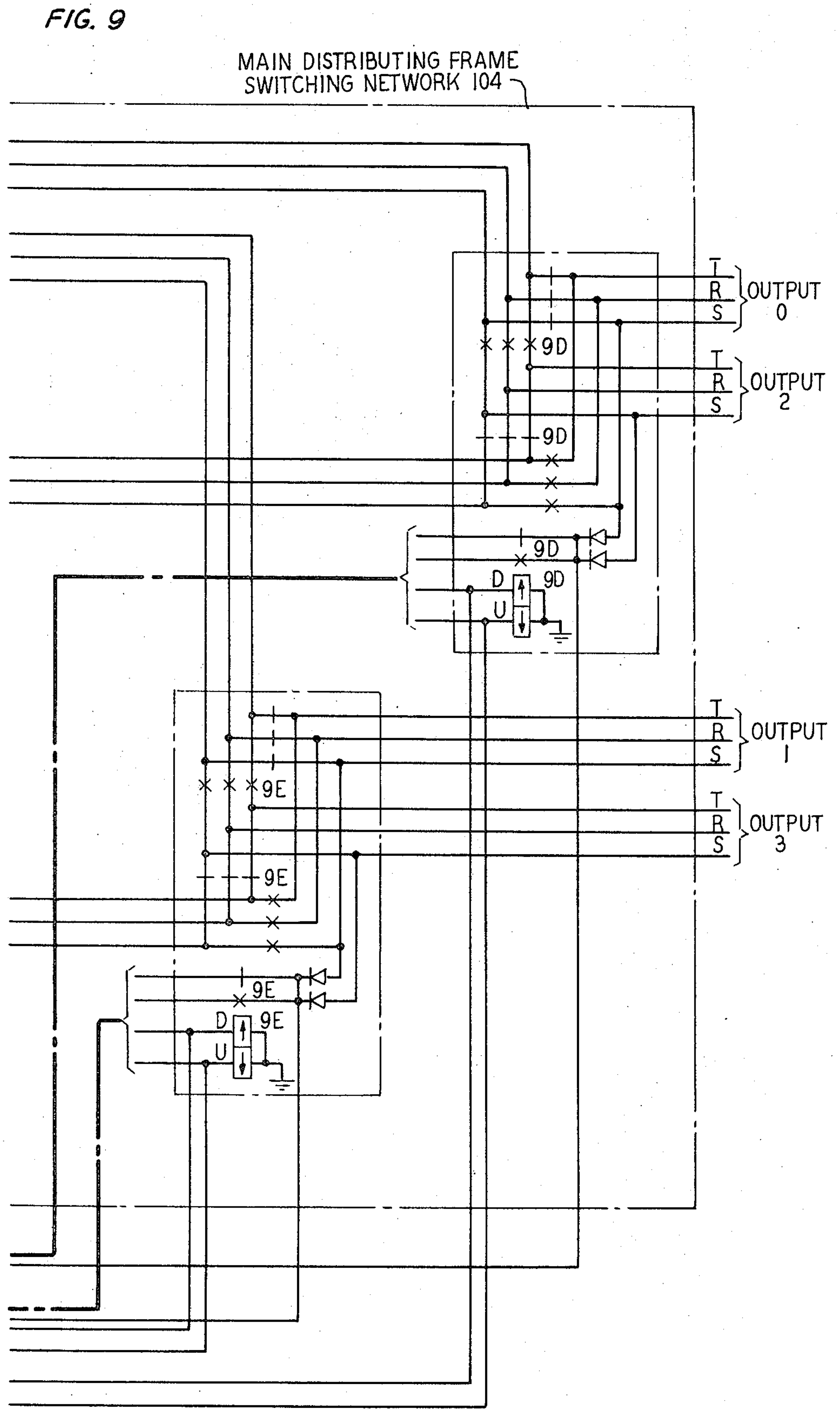

FIG. 4 and FIG. 6 contain the apparatus of permutation storage and network control circuit 103 which is necessary to implement or to modify the paths through main distributing frame switching network 104 which is shown on FIGS. 8 and 9. FIG. 5 contains the circuitry for counting and steering the various character designations which have been transmitted from teletypewriter 101. FIG. 7 portrays the apparatus necessary for the registration and storage of the permutation which is currently effective in main distributing frame switching network 104.

Proceeding now with the detailed description; as earlier discussed, one of the principal functions of the illustrative circuitry is to control the network paths through switching network 104. An examination of FIGS. 8 and 9 will reveal that the relatively simple example of a 4x 4 network is shown therein comprising inputs 0 through 3 and outputs 0 through 3. It will be obvious that from that which is contained hereinafter that this particular network size has been selected in order to more clearly explain the principles of my invention and that the principles of my invention may be thereupon readily applied to switching networks of a size limited only by the particular needs of a given installation.

In the following text two modes of operation will be described. The first section of the detailed description will describe the "initializing" or complete resetting mode, the object of which is to register and implement a complete permutation. To do this requires the teletypewriting of a message consisting of four digits each with a value of 0 to 3 (no digit value appearing more than once). The message is of the form $$:X_0\,X_1\,X_2\,X_3,$$

where the X's form the initial permutation of the outputs of the network with respect to the inputs. In this regard, it will be noted that the initial permutation is 0 1 2 3 since in the released state of relays 8A, 8B, 8C, 9D and 9E continuity exists between the T R and S conductors which extend through the switching network between the inputs and the outputs each respectively designated 0, 1, 2, and 3.

Another section of the detailed description will describe the "change" mode. This mode is used to insert each subsequent network change which is desired. To do this requires the teletypewriting of a message of the form $$-X\,Y,.$$

The X value identifies the numerical position of the input which is to be connected or changed to the Y value. The message thus means "change input X to output Y," or, in other words, connect X to Y. As a corollary it will be apparent from that which is contained hereinafter that the output to which X was formerly connected is now interchanged with Y. It will also be apparent from that which is contained hereinafter that the change mode may be repeated for several changes before execution. Thus, the input messages may be of the form $$-X_1\,Y_1,-X_2\,Y_2,-X_3\,Y_3,.$$

2.1 Initializing Mode

We shall assume for the purpose of description that all circuitry is initially in a normal state. Thus, an initial permutation, as earlier discussed, of 0 1 2 3 prevails in switching network 104. We shall further assume that a message is transmitted on teletypewriter 101 as follows:

:2 3 0 1.

Proceeding now with the description, current present from ground through enabled contact 2AON in teletypewriter 101 maintains relay 2RT in character counting and registration circuit 102 in an enabled state by an obvious circuit. Transmission of a character is manifested by opening of the line with relay 2RT released and the distribution brush 201 advancing across the terminals which are connected to relays 21 through 25 and relay 2Er in character counting and registration circuit 102. The particular code transmitted determines the particular combination of relays 21 to 25 which will be operated as shown in the table in FIG. 10. The identifying code for the respective characters consists of various combinations of the digits 1 through 5. Thus, for example, a code consisting of digits 1 and 2 will operate relays 21 and 22 and be recognized as the transmission of the dash characters as set forth in the table in FIG. 10.

To activate the initializing mode, relays 22, 23 and 24 operate indicating transmission of a colon. Relay 2RT in releasing provides an obvious temporary locking path for relays 21 through 25. The release of relay 2RT also completes the obvious operate path of relay 30N and relay 31CO. The operation of relays 30N and 31CO also completes the obvious operate path of relay 31C. The enabling of relay 31C closes make contacts 31C-1 through 31C-5 thereby steering the signals present on the contacts respectively designated 1 on relays 21 through 25 to thereby complete the operate path of the corresponding relays 211, 212, 213, 214 and 215. In view of the transmission of the colon character, relays 212, 213, and 214 operate at this time and lock operated through enabled make contact 30N-3. REIay 2CL also now operates through enabled make contacts on the 212, 213 and 214 relays as in an indication that the initializing mode is in effect.

Enabled break contact 2CL-2 opens the locking path of relays 7K0, 7K1 to 7N0, 7N1 which may have been previously operated, thereby restoring the permutation storage circuitry to normal. Upon the generation of the initial character, relay 2RT reoperates when distribution brush 201 returns to the initial position. The previously operated relays 22, 23 and 24 now also restore to normal upon the reenabling of break contact 2RT-1. The operation of break contact 2RT-4 now permits relay 31CR to operate by removing the ground shunt present on the right-hand winding terminal of relay 31CR. Thus, relay 31Cr operates from battery extended through the winding of the 31CO relay, through the winding of the 31CR relay, through enabled make contact 31CO-2, and enabled make contact 30N-2 to ground. The enabling of break contact 31CR-2 opens the previously described operate path of relay 31C releasing that relay. The next four characters, namely, the digits 2 3 0 1 are received in sequence in a manner similar to that above described for the initial character with relays 21, 22, 23, 24 and 25 being operated in combinations representing digit values 0 to 3 in accordance with the table shown in FIG. 10. Each character as transmitted is recorded on the 2X0 and/or 2X1 relays as determined by the particular value transmitted. Thus, upon the transmission of the digit value 2, relays 21, 22 and 25 are in an operated state. The corresponding make contacts, each designated 1, are thus enabled, and extend ground through enabled make contact on the 32C relay to respectively cause the operation of relays 221, 222 and 225. Thus, in a manner similar to that earlier described for the reception of the initial character, relay 2X1 operates while relay 2X0 remains normal thereby recording the reception of the digit 2.

It will now be necessary to store this initial value in the 7K0 and 7K1 relays in the permutation storage circuit; however, prior to describing the manner in which the numerical recitation of the selected permutation is registered and stored in the permutation storage and network control circuit, it is believed it would be beneficial to first describe how the character counting circuitry and steering circuitry shown on FIGS. 5 and 7 function.

Relays 5KA and 5KA1 through 5NA and 5NA1 are provided to detect and count the characters as they are received. The initial release of break contact 2RT-5 extends ground from enabled make contact 3PON-2 through operated make contact 2CL-3, enabled make contact 32C-1, and released transfer contact 5KA1-1 to complete the operate path of relay 5KA. REIay 5KA thus detects that the transmission of a character has been commenced. Ground present on the upper terminal of the winding of relay 5KA is also extended to the upper terminal of the winding of relay 5KA is also extended to the upper terminal of relay 5KA1 to maintain relay 5KA1 in a released (shunted) condition. Upon the registration of the transmitted character, relay 2RT reoperates as earlier described thus opening break contact 2RT-5 which removes the shunt from the winding of the 5KA1 relay thereby permitting its operation through enabled make contact 5KA-2. Relay 5KA1 thereupon locks operated by an obvious circuit path through enabled make contact 5KA1-2 thereby detecting the end of the transmission of a particular character. The enabling of make contact 5KA1-3 extends ground to the winding of relay 5KI through enabled make contacts 32C-2 and 2CL-4, released break contact 5MTI-1, and through a chain of transfer contacts numbered 3 on relays 5NAI, 5MAI, and 5LAI. Accordingly relay 5KI operates. It will be noted that relay 5XA previously operated via an obvious operate path extending through enabled make contacts 32C-8 and 2CL-8.

Turning now to FIG. 7, it will be recognized that the 5KI relay contacts steer any information present on the 2X1 and 2X0 relay contacts which is thus extended via enabled make contacts 5XA-1 and 5XA-2 to the operate windings of the 7KO and 7KI relays. Accordingly, relay 5KI serves a steering function so as to cause the registration of the transmitted character in the sequence in which it was received.

Subsequent characters which are transmitted are counted and steered by the operation of relays 5LA, 5MA, and 5NA and relays 5LI, 5MI, and 5NI in a manner identical to that described for the initial character by relays 5KA and 5KI. As a result, relays 5LI, 5MI, and 5NI operate in sequence so as to se steer each transmitted character to the appropriate relays 7LO and 7LI through 7NO and 7NI.

Referring now to FIG. 7, the initially transmitted digit 2 is thereupon registered on the permutation storage relays in a manner as follows: Ground is extended through enabled make contact 30N-1, enabled make contacts 2x1-1 and 5XA-1, th. ough enabled make contact 5KI-1 to complete the operate path of relay 7K1. RElay 7K1 subsequently locks operated through enabled make contact 7K1-1, released break contact 5KI-5, and operated make contact 32SR-1 to ground. Relay 7KO remains in a released state since make contact 2xO-1 is not enabled at this time. Thus the 7KO and 7KI relay state have registered the initial digit 2 of the transmitted set of characters.

Digits 3, 0 and 1 are now recorded sequentially on the 2XO and 2X1 relays and are extended to the 7L0 and 7L1 through 7N0 and 7N1 relays in a manner identical to that above described for the initial digit. In view of the initial example selected, a namely, a permutation identified as 2 3 0 1, relays 7K1, 7L0, 7L1 and 7N0 are in an operated state at this time to indicate the registration and storage of the desired permutation.

Upon the operation of relay 5NA1 upon receipt of the fourth digit (fifth transmitted character), the previously described operate path of relay 32C is opened by break contact 5NA1-4 thereby releasing relay 5XA. At the start of the transmission of the sixth character, relay 2RT will release as earlier described. The release of break contact 2RT-4 extends ground to operate relay 34C via enabled transfer contacts 31CR-1, 32CR-3, and enabled make contacts 2CL-5, 5NA-3 and 5NA1-5. The enabled condition of make contacts 34C-1 through 34C-5 extends the leads from the character indicating relay contacts of FIG. 2 to the registration relays 341 through 345 so as to permit registration of the sixth character. Accordingly, relay 3CA operates at this time record the end of the character cycle for the intiializing mode. Relay 3CA locks operated through enabled make contact 3CA-2 to ground present on the enabled make contact 3PON-4 in FIG. 2.

Summarizing briefly, all six characters have been received indicating the particular permutation which is to be effected in main distributing frame switching network 104. This information is presently registered on the 7K0 and 7K1 through 7N0 and 7N1 relays. Relay 5IC now operates by an obvious circuit path to start the translation of the registered permutation into a particular combination of crosspoints to be operated and released within main distributing frame switching network 104. The particular translation required for the various combinations is shown in the table on FIG. 11. From an inspection of the table in FIG. 11 it will be obvious that in order to implement the permutation 2 3 0 1, relays 9D and 9E must be enabled in main distributing frame switching network 104.

Examination of FIGS. 4 and 6 will reveal that relays 4AI, 4BC, 4CI, 6DI and 6EI are controlled by enabled make contacts on the permutation storage relays 7K0 and 7K1 through 7N0 and 7N1. Transfer contacts on relays 4AI, 4BI, 4CI, 6DI, and 6EI extend control leads from FIG. 7 to the operate winding of relays 8A, 8B, 8C, 9D and 9E. The enabled condition of make contact 5ICA-2 provides ground to the left side of the 7RE relay. It will be obvious that relay 7RE will operate from battery through resistance 701 unless ground is present at the junction of the 701 resistance and the right terminal of the winding of the 7RE relay. An inspection of FIGS. 7, 8 and 9 will reveal that the S leads (sleeve leads) associated with all crosspoints within switching network 104 are extended through contacts of the crosspoint and the correspondingly designated 4AI, 4BI, 4CI, 6DI, and 6EI transfer contacts, respectively, to the aforesaid junction point of the 7RE winding and resistance 701. It will be recognized from that which is contained hereinafter that in the event any of the circuits which are extended through switching network 104 are in a busy condition, a ground will be present on the associated sleeve lead. Thus, relay 7RE is prevented from operating until all circuits are in an idle condition, thereby preventing execution of the permutation and interference with existing service calls during the busy state of such circuits.

Upon the operation of relay 7RE, enabled make contact 7RE-1 enables lamp 202 as an indication to the teletypewriter attendant that the circuitry is prepared to execute the registered permutation.

A period is now teletyped indicating the completion of the instructions and thus constitutes a command for execution. In a manner similar to that hereinbefore described, relay 3P now operates upon registration of the final character. It will also be noted that the aforesaid execute command may, in fact, have been generated immediately after the transmission of the previous character in which case the execution, which is about to be described, would have occurred immediately upon the operation of relay 7RE.

In view of the earlier described state of the 7K0 and 7K1 through 7N0 and 7N1 relay contacts and, in accordance with the table shown on FIG. 11, it is now necessary to enable relays 9D and 9E. Accordingly, control relays 6DI and 6EI are enabled at this time through operated contacts on the 7K0 and 7K1 to 7N0 and 7N1 relays. Relay 7EX now operates via a circuit which extends through enabled make contacts 3P-2 and 7RE-1, and released break contact 7EXA-1. The enabling of make contacts 7EX-1, 7EX-2, 7EX-3, 7EX-4 and 7EX-5 extends battery through the contacts of the cross point relays 8A, 8B, 8C, 9D and 9E and the corresponding contacts of the 4AI through 6EI crosspoint relays. This battery thus either operates or releases the crosspoint relay so as to place them in a state which conforms to the state of the crosspoint control relays 4AI through 6EI. The crosspoints may advantageously be arranged to function in the manner of the well-known ferreed relays so that only a short pulse is needed since the contact of the crosspoint will shortly open this path as it changes state. The operation of relay 7EX also completes the obvious operate path of relay 7EXA which thereupon locks operated through an obvious circuit.

When the relays which control the crosspoints in switching network 104 are in agreement with the operated or released state of the crosspoint control relays 4AI through 6EI, relay 7CK will operate by an obvious circuit which extends from resistance battery on transfer contact 4AI-2 in FIG. 7, through a chain of contacts in the crosspoint control relays and crosspoint relays, through released break contact 7EX-9, and through enabled make contacts 7EXA-5. The operation of make contact 7CK-1 in FIG. 2 enables lamp 203 in teletypewriter 101 to indicate that the desired permutation has been effected. Relay 30N is released by the enabling of break contact 7CK-2 thereby restoring all priorly operated apparatus with the exception of relay 7CK and relay 2RT. The operated crosspoint control relays 6DI and 6EI also remain enabled under control of transfer contacts 5IC-3 which is shown in FIG. 7.

In addition, the now effective permutation remains in storage in the 7K0 and 7K1 through 7N0 and 7N1 relays which remain operated through a locking ground provided through released break contact 2CL-2. Although these relays may be advantageously employed to provide a memory function of the existing permutation between modes in the instant embodiment, it is obvious that more sophisticated electronic storage apparatus may, in fact, be employed where the requirements of a particular application so dictate.

2.2 Change Mode

As earlier set forth, at this point in time the existing permutation in the main distributing frame switching network is 2 3 0 1. We have assumed the release of control circuitry, and the enabled state of crosspoint relays 9D and 9E to bring about this particular permutation. However, as also noted, the particular permutation which exists on switching network 104 is also stored in the permutation storage and network control circuitry, and more specifically in the apparatus which is shown on FIG. 7. Thus, relay 7K0 is released and relay 7K1 is operated as a manifestation in accordance with the code shown in FIG. 10 that the initial digit of the permutation is the digit 2. In similar fashion the second digit, which is 3, is manifested by the operated state of relays L0 and L1. The 0 digit, which is the third digit of the present permutation, is manifested by the released condition of relays M0 and M1. And, finally, the operated state of relays N0 and the released state of relay N1 indicates that the final digit of the permutation is the digit 1.

Proceeding now with the description. We shall assume that it is desired to change the existing permutation at this time and, further, that it is the intention of the attendant at teletypewriter 101 that the permutation 2 3 0 1 be changed to the permutation 1 3 0 2. This, in effect, means that it is desired now to connect input X (viz, 0) to output Y (viz, 1). As earlier described, the instruction will be of the following form:

–XY,.

Accordingly, in view of the specific example selected, the attendant at teletypewriter 101 will transmit four characters. The first character will be the transmission of the digits 1 and 2 to identify the dash character. Similarly, digits 2, 3, and 5 will be transmitted to identify the value of the X character which, at this point should be noted, actually identifies the numerical position of the input which is to be connected or changed to the Y value. The digits 1, 2 and 3 are then transmitted as the third character to identify the digit 1 which is the value of Y in the selected example. And, finally, the comma is transmitted as the final character via the transmission of digits 3 and 4.

Turning now to the specific illustrative circuitry, the teletyped characters are successively entered into the respective character register manifested by relays 211 through 215, 221 through 225, 331 through 335 and 341 through 345. Thus, upon receipt of the initial character, relay 2DA operates in a manner identical to that hereinbefore described for relay 2CL as an indication that the change mode is in effect. With relay 2DA operated, the second character is steered through operated contacts of the 32C relay to the 2X0 and 2X1 relays which do not operate at this time thereby manifesting reception of the digit 0. The character counting chain comprising the 31C and 32C relays thus function as earlier described and relay 33C now operates in a similar manner through enabled make contacts 2DA-8 to permit registration of the Y value on relays 3Y0 and 3Y1 at this time.

Thus, relay 3Y0 operates while relay 3Y1 remains released to manifest registration of the digit 1. In similar fashion, the operation of relay 34C permits storage of the final character resulting in the operation of relay 3CA at this time which locks operated through enabled make contact 3CA-2 through to ground present on enabled make contact 3PON-4 in FIG. 2. Upon the registration of the final character, the algorithm sequence for changing the permutation registration is now placed in effect.

Referring now to FIG. 5, relay 5MTI now operates through a path which extends through enabled make contact 3CA-2, released break contact 5MT-1, enabled make contact 2DA-2 through to ground present on the enabled make contact 3PON-2. The enabling of relay 5MTI closes make contact 5MTI-3 to provide ground to pulser 501 which causes the stepping of the counter chain on the 5KA and 5KA1 through 5NA and 5NA1 relays through the operation and release of the 5PU relay which is controlled by the pulser 501. Pulser 501 may comprise any number of configurations well known in the art operable to extend and remove a ground signal from relay 5PU at a rate which is suitable to advance the counting relays.

This advance of the relay counting chain is accomplished through the opening and closing of break contact 5PU-1 in synchronization with the operated and released state of relay 5PU. The ground signal present through the 5PU-1 break contact is thus extended through the 5KA1-1 transfer contact to the counting chain to cause the stepping of the counting chain relays in a manner identical to that described hereinbefore under control of break contact 2RT-5.

Referring now to FIG. 7, it will be noted that the operate path of relays 7MTO and 7MT1 are extended through enabled make contacts 5MT1-4 and 5MT1-5 to an appropriate set of 7K0 and 7K1 through 7N0 and 7N1 relays depending upon which of the 5KA through 5NA relays are enabled at a given instance. As earlier described, the particular 5KA through 5NA relay which is operated is determined by the relative position of each character in the group of characters representing the permutation. It will thus be obvious that the operating ground present on the respective 7K0 and 7K1 through 7N0 and 7N1 relay sets will be extended to cause the corresponding operation of relays 7MT0 and 7MT1 as the counting chain relays advance.

An inspection of the operate path of relay 5MT will reveal that this relay will operate when a match exists between the operated state of the 7MT0 and 7MT1 relays and the operated state of the 3Y0 and 3Y1 relays. Therefore, relay 5MT will operate when the state of the 7MT0 and 7MT1 relays indicate an identity of value with respect to the value of the Y character which has been received from teletypewriter 101. We have assumed this Y value to be the digit 1.

The initial permutation selected was 2301. Therefore, the digit 1 is presently a recorded by the 7N0 and 7N1 relay set. It will thus be recognized that the counting chain will advance resulting in the operation of relays 5KA, 5LA, and 5MA in sequence without finding the value Y. However, upon the operation of relay 5NA, the information which is stored on the 7N0 and 7N1 relays which are thereupon transferred to the 7MT0 and 7MT1 relays will result in the operation of relay 5MT since at this time the value of Y will have been found. Thus, the search for the value of Y in the permutation may cease. The enabling of break contact 5MT-2 opens the start lead to pulser 501 thereby releasing it, stopping the advance of the counter and also releasing relay 5MTI at this time.

Summarizing briefly, upon the reception of characters indicating that the change mode is to be initiated, the permutation storage relays have been interrogated in order to ascertain where the value of Y is presently stored. It has been ascertained that the value of Y is presently stored on the 7N0 and 7N1 relays. It will now be necessary to place into this location the information presently stored at the location identified by the value of the character X, which we have assumed to be 0.

Proceeding now with the description, the release of the 5MTI-1 break contact completes the operate path of relay 5NI which extends through enabled transfer contact 5NA1-3, 5MTI-1, enabled make contact 5MT-6, and released break contact 5DL1-2. The enabling of relay 5NI opens break contacts 5NI-6 and 5NI-7 thereby interrupting the locking path for the 7N0 and 7N1 relays thus restoring them to normal and erasing the information stored therein.

Relay 5XLA operates in parallel with are relay 5NI at this time through enabled make contact 5MT-4 thereby completing the operate path of relay 5DL which extends through enabled make contacts 5SLA-2, 3CA-4 and 5MT-6, and released break contact 5DL1-2 to ground. However, relay 5DL is arranged to be slow-operating and its operation is delayed for an interval of time sufficient to permit the storage of the value of X into the permutation storage relays as will be apparent from that which is contained hereinafter.

The enabling of make contact 5XLA-5 extends the ground present on the right terminal of the 5XLA winding through released break contact 5YA-2 and enabled make contact 2DA-6 to a contact network on the 2X0 and 2X1 relays which are operated on so as to identify the position in which the value of X is presently stored in the permutation storage circuitry. Thus, in view of the of the example selected that the value of X is 0, both relays 2X0 and 2X1 are in a released condition. Therefore, relay 5KA operates at this time via its its secondary winding.

Referring now to FIG. 7, it will be recalled that the 5KA relay contacts are associated with the 7K0 and the 7K1 storage relays. The 7K0 and 7K1 storage relays are the apparatus in which the value of X is presently stored. Accordingly, upon the operation of the 5KA-2 and 5KA-3 make contacts, the ground signal from the 30N-1 make contact is extended through the enabled make contact 7K1-2 and enabled make contact 5KA-3 and down through the enabled make contact 5N1-3 to complete the operate path of relay 7N1 at this time. It will be noted that since we have previously assumed that the digit value stored on the 7K0 and 7K1 relays is the value 2, relay 7K0 will be in a released state while relay 7K1 will be operated. It will thus be obvious that while ground is extended to cause the operation of relay 7N1 at this time, relay 7N0 will remain in a released state. When this registration has taken place, slow operate relay 5DI operates. The enabling of make contact 5DL-2 completes the obvious operate path of relay 5DL1 at this time. The resultant operation of break contact 5DL1-2 opens the previously described operate path of the 5KA and 5NI relays. It will be obvious that relay 7N1 will remain operated and thus the relay set of relays 7N0 and 7N1 now contain the value which had previously been stored at the position in the register identified by the X character.

The enabling of make contact 5DL1-3 extends ground from the enabled make contact 3PON-4, released break contact 5DL-2 and released transfer contact 5YA-2 to complete the operate path of relay 5YA at this time which locks operated by an obvious circuit. Concurrently therewith, this ground is extended through released break contact 2CL-7 and through a network of contacts on the 2X0 and 2X1 relays. As earlier described, in view of the fact that these relays contain the value 0, both relays will be in a released condition thereby completing the operate path of relay 5KI. An inspection of FIG. 7 will reveal that the enabling of break contacts 5KI-4 and 5KI-5 open the previously described locking path for the 7K0 and 7K1 relays thereby permitting their release. Concurrently therewith, the enabling of the 5YA-3 and 5YA-4 make contacts extend the ground signal from the enabled make contact 30N-1 through 3Y1-3 and 3Y0-3 make contacts to permit reoperation of the appropriate 7K0 and 7K1 relays. Since we have assumed that the value of the information registered on the 3Y0 and 3Y1 relays is the digit 1, only 3Y0 is operated at this time in accordance with the table shown on FIG. 10. Thus, only make contact 3Y0-3 is enabled, thereby completing the operate path of relay 7K0 while permitting relay 7K1 to remain in a released condition.

It will now be recognized that relays 7K0 and 7K1 through relays 7N0 and 7N1 now have stored thereon a permutation identified by the digits 1 3 0 2 and that this permutation thereby replaces the permutation previously identified as 2 3 0 1.

Normally in the change mode, the comma will be followed by a period which will cause execution of the desired change in permutation when the crosspoints involved are not busy as earlier described. However, it is obvious from that which is contained hereinbefore, that another submode may be utilized in which the comma may be followed by another set of characters comprising

—XY, thereby permitting the execution of several changes before the period is finally transmitted.

Upon the operation of make contact 5YA-6, the operate path of relay 5DL is again completed and relay 5DL now operates having allowed a sufficient interval of time for the aforesaid storage to at take place. The enabling of make contacts 5DL-3 and 5YA-4 now completes the operate path of relay 5IC which, as described hereinbefore in detail, starts the process of translating the stored permutation into a corresponding change in the setting of the crosspoints of switching network 104. The operation of the circuitry in connection therewith is substantially identical to that set forth earlier. Upon completion, the permutation control circuitry restores to normal. The permutation information, however, remains stored on relays 7K0 and 7K1 through relay 7N0 and 7N1 until such time as an additional change in switching network 104 is required to as above set forth.

3. Maintenance Facilities

FIGS. 1B and 1C show another aspect of my invention comprising a test desk 109 and associated test circuit 111. It is intended that test desk 109 represent the well-known local test desk which is provided for supervising the testing of the various central office circuits and line facilities associated with each central office or wire center. Test facilities junctor circuit 110 is also shown terminated on main distributing frame network 104B at output terminal 2 and input terminal 3.

Although it will be obvious from that which is contained hereinafter that the selection of a particular permutation in switching network 104B may, in fact, be accomplished as hereinbefore described by the enabling of teletypewriter 101, we shall assume in the following that test desk 109 is also equipped with equivalent signal generating facilities and is associated with character counting and registration circuit 102 in a manner identical to that hereinbefore described for teletypewriter 101. In similar fashion, permutation storage and network control circuit 103 is associated with main distributing frame switching network 104B. It will be noted that cable TDA, which is intended to include at least the well-known tip, ring and sleeve conductors, extends from output terminal 2 through test facilities junctor circuit 110 to test desk 109. In similar fashion cable TDB is intended to consist of at least the three well-known conductors designated tip, ring and sleeve also extends through test facilities circuit 110 to test desk 109.

Proceeding now with the description, as earlier noted herein, one of the principal functions of a distributing frame is to provide a common point of access for various inside plant and outside plant circuits. It will thus be recognized that the termination of test facilities circuit 110 in the above-described manner will permit the extension of any circuits associated with input terminal 3 and output terminal 2 of switching network 104B through to test desk 109. For example, proceeding in a manner identical to that hereinbefore described, upon generation of an appropriate change of permutation command, input terminal 3 may be associated with output terminal 1 so as to provide access from line circuit 126 through test facilities circuit 110 to test desk 109. Test desk 109 may be associated with test circuit 111 in the well-known manner and we shall assume that test circuit 111 contains the control, supervisory and indicating leads necessary to permit appropriate tests to be conducted of line circuit 126 or contains circuitry operative to provide intercept information for a calling connection directed to line circuit 126.

In similar fashion in a manner identical to that hereinbefore described, upon generation of an appropriate change of permutation command, input terminal 0 may be associated with output terminal 2 thereby extending the conductors associated with station S4 through test facilities circuit 110 to test desk 109. At test desk 109 the aforesaid conductors may be extended in the well-known manner to test circuit 111 which we shall assume for purposes of this example contain the apparatus necessary to test circuits which extend through the outside plant to a particular telephone station.

It is also to be noted that test circuit 111 may, in fact, comprise circuitry which performs certain wee well-known tests upon being serially inserted between inside plant and outside plant facilities; i.e., between the input and the output terminals of switching network 104B. Thus, assuming the immediately foregoing examples to both be valid requirements of a given test, test circuit 111 may, by techniques well known in the art (i.e., via key operation or plug and jack operation at test desk 109), be serially inserted between cable conductors TDA and TDB, thereby resulting in a connection which extends from station S4 through input terminal 0 and output terminal 2 of switching network 104B, via test facilities circuit 110 and cable TDA to test circuit 111 and thence via test circuit 111 through cable TDB, via test facilities circuit 110 to input terminal 3 on switching network 104B, and via switching network 104B to output appearance 1 to line circuit 126, and via line circuit 126 through to any other circuitry in the office which is required to be selected.

Thus, by following the procedural steps outlined hereinbefore for teletypewriter 101, test desk 109 may, via test facilities junctor circuit 110, be permitted automatic access to each set of outside plant conductors and each set of inside plant conductors associated with switching network 104B either independently or concurrently. It is obvious from that which is contained hereinbefore that test desk 109 may, by applying the aforesaid principles of my invention, be arranged to thus serve a plurality of wire centers from a central location. It is also obvious that the aforesaid principles of my invention may be applied wherein the test desk 109 is replaced with an automatic test circuit arranged to select and test various input and output appearances in a predetermined sequence. As above set forth, the access to the various circuits is thereby provided automatically without the requirement of manual placement of test facilities on the part of test personnel.

4. Summary

It is obvious from the foregoing that the flexibility, economy, and efficiency of switching systems may be substantially enhanced by the provision of a memory controlled main distributing frame switching network which is responsive to control signals from an external source for interconnecting internal central office circuits with remote station equipment and for associating test and maintenance circuitry therewith. It is further obvious from the foregoing that the aforesaid main distributing frame frame switching network, when inserted serially between telephone system station apparatus and the conventional telephone switching network, obviates the requirement for manual placement of cross-connections.

While the equipment of my invention have been described with reference to a particular embodiment whereby the manual cross-connection of distributing frames is obviated in telephone system central offices and wherein facilities are provided for automatic selection of inside and outside plant conductors for test purposes, it is to be understood that such an embodiment is intended to be illustrative of the principles of my invention and that numerous other arrangements may be devised by those skilled in the art without departing from the spirit and scope of the invention.

I claim:

1. In a communication system having a switching network for completing communication paths the combination comprising:
- a plurality of outside plant conductors, a plurality of inside plant conductors, selectively operable signaling means, and a rearrangeable switching network comprising;
  - control means enabled in response to signals from said selectively operable means for interconnecting selected said outside plant conductors with selected said inside plant conductors via exclusive linkage paths, and
  - means responsive to further said signals for releasing certain said exclusive linkage paths and for reconnecting certain of said selected outside plant conductors via other exclusive linkage paths to other said inside plant conductors.

2. In a telephone system, the combination set forth in claim 1 further comprising:
- means for detecting a predetermined state of said certain linkage paths; and
- means controlled by said detecting means for delaying the enabling of said releasing means during the said predetermined state of any of said certain linkage paths.

3. In a communication system, the combination set forth in claim 1 wherein said selectively operable signaling means comprises a teletypewriter operatively associated with said control means.

4. In a communication system having a plurality of first switching networks for completing communication paths, the combination comprising:
- selectively operable signaling means;
- a plurality of other switching networks each comprising outside plant conductor terminals and inside plant conductor terminals and wherein each said other network is associated with one of said first networks;
  - control means enabled in response to signals from said selectively operable means for interconnecting selected said outside plant terminals with selected said inside plant terminals via exclusive linkage paths through a selected one of said other networks, and
  - means responsive to further said signals for releasing certain said exclusive linkage paths and for reconnecting certain of said selected outside plant terminals via other exclusive linkage paths to other said inside plant terminals through said one network.

5. In a communication system, the combination set forth in claim 4 further comprising:
- means for detecting a predetermined state of said certain linkage paths; and
- means controlled by said detecting means for delaying the enabling of said releasing means during the said predetermined state of any of said certain linkage paths.

6. In a telephone system: a plurality of station circuits, a plurality of switching circuits, a teletypewriter, and a rearrangeable switching network comprising:
- control means enabled in response to signals from said teletypewriter for interconnecting selected said station circuits with selected said switching circuits via exclusive linkage paths;
- means responsive to further signals from said teletypewriter for releasing said exclusive linkage paths and for reconnecting certain of said station circuits and said switching circuits via other exclusive linkage paths;
- means for detecting the idle or active state of said linkage paths; and
- means controlled by said detecting means for delaying the enabling of said releasing means during the active state of any said linkage paths.

7. In a telephone system,
- a rearrangeable main distributing frame switching network comprising input and output appearances and linkage paths for interconnecting said input and output appearances in selected permutations;
- a plurality of station circuits each connected to individual said input appearances;
- a plurality of central office circuits each connected to individual said output appearances;
- means independent of said station circuits for generating coded data representative of a first said permutation; and
- means controlled by said generating means for enabling said switching network.

8. In a telephone system, the combination set forth in claim 7 further comprising:
means for storing said first permutation;
means responsive to generation of further coded data for modifying said stored permutation; and
means responsive to the enabling of said modifying means and controlled by said storage means for enabling said linkage paths in accordance with another said permutation.

9. In a telephone system, the combination set s forth in claim 8 wherein said first permutation is identified by coded data comprising:
a series of characters of the form
:$X_0, X_1, X_2, X_3, \ldots X_N$. and
wherein said further coded data comprises a series of characters of the form XY wherein Y represents the value to which X is to be changed.

10. A telephone central office comprising a plurality of stations and a switching network for completing telephone communication paths:
a rearrangeable main distributing frame switching network serially inserted between said stations and said network each comprising input and output appearances and linkage paths for interconnecting said input and output appears appearances in selected permutations;
means independent of said stations for generating coded data representative of a first said permutation;
means for storing said coded data;
means controlled by said storage means for enabling said switching network; and
means responsive to a a predetermined state of said linkage paths for inhibiting said enabling means.

11. The combination set forth in claim 10 further comprising:
means for registering further said data;
means controlled by said registering means for modifying said stored data; and
means responsive to the enabling of said modifying means for reenabling said enabling means.

12. In a telephone system a plurality of stations, a plurality of trunks a first switching network comprising:
a plurality of line circuit input appearances;
a plurality of trunk circuit input appearances;
means for interconnecting any said line circuit output appearance with any said trunk input appearance; and
a second switching network interposed between said stations and said first switching network comprising:
a plurality of station appearances,
a plurality of line circuit input appearances,
selectively operable means for generating control signals for identifying a station appearance and a line circuit input appearance which are to be interconnected by said network,
means responsive to control signals from said selectively operable means for interconnecting any one said station appearance with any one line circuit input appearance via a first unique linkage path,
means automatically responsive to further control signals from said selectively operable means for interchanging said first linkage path with another said linkage path,
memory means operable to store information indicating the idle or active state of any said station appearance, and
means controlled by said memory means for delaying the enabling of said interchanging means.

13. In a telephone system:
a rearrangeable main distributing frame switching network comprising input appearances and output appearances and means for interconnecting said input and output appearances in selected permutations via exclusive linkage paths;
a plurality of station circuits each connected to individual said input appearances;
a plurality of central office circuits each connected to individual said output appearances;
junctor means having a first terminal connected to one of said input appearances and a second terminal connected to one of said output appearances, test means; and
supervisory means operatively associated with said junctor means comprising selectively operable means for connecting either said terminal to said test means.

14. The combination set forth in claim 13 wherein said supervisory means further comprises means for connecting said testing means serially between said first and second terminals.

15. The combination set forth in claim 13 wherein said supervisory means further comprises:
selectively operable means for generating signals identifying a selected permutation in said switching network; and
means responsive to the enabling of said generating means for implementing said selected permutation in said switching network.